Patented Aug. 18, 1953

2,649,443

UNITED STATES PATENT OFFICE 2,649,443

PENICILLIN SALTS OF N-METHYL-(1,2-DI-p-METHOXYPHENYL - 2 - HYDROXYETHYL) AMINE

Vernon V. Young, Terre Haute, Ind., assignor to Commercial Solvents Corporation, Terre Haute, Ind., a corporation of Maryland No Drawing. Application July 30, 1952,
Serial No. 301,792

6 Claims. (Cl. 260—239.1)

This invention relates to salts of penicillin and more particularly it relates to penicillin salts of isomeric N-methyl-N-(1,2-bis-p-methoxyphenyl-2-hydroxyethyl) amine.

All penicillin salts are not practical for therapeutic use. For example, a penicillin salt may not be stable at ordinary temperatures and thus in order for the therapeutic activity of the salt to be retained, it must be refrigerated during storage or else rapid deterioration of the therapeutic activity occurs. Some penicillin salts are too toxic for use therapeutically and hence must be ruled out completely.

In addition to the stability and toxicity characteristics of penicillin salts, consideration must also be given to their solubility properties. The expression of favorable solubility properties is found in the measurement of blood levels of penicillin at intervals after injection into or ingestion by the body. The longer penicillin can be found in the blood after it has been placed in the body, the more effective it is against the pathogenic organisms present in the body, provided they are penicillin susceptible. If, however, blood levels of penicillin are only maintained for short periods after injection or ingestion of the penicillin salt, the penicillin content of the salt is largely wasted and there is little or no alleviation of the pathological condition being treated unless there are repeated administrations of the penicillin salts at short intervals.

Water-soluble salts of penicillin are known as non-repository forms of penicillin while the water-insoluble salts of penicillin are known as repository forms. The distinction between repository and non-repository forms of penicillin becomes important when it is considered that the repository forms are slowly absorbed into the blood stream from the tissues following injection into the body and this slow absorption tends to give prolonged blood levels of penicillin and consequently the repository forms are more effective against pathogenic organisms present in the body. The non-repository forms of penicillin are quickly absorbed into the blood stream giving high initial penicillin blood levels which decline rapidly until the penicillin disappears from the blood in a very short time.

An object of the present invention is to provide stable penicillin salt compositions of low toxicity which give prolonged blood levels of penicillin whether given orally or by injection and which are of a repository nature.

I have now discovered stable penicillin salts possessing low toxicity characteristics which give prolonged blood levels after being injected into the body or after being administered orally due to their repository nature. My new compositions are penicillin salts of N-methyl-N-(1,2 - bis - p - methoxyphenyl-2-hydroxyethyl) amine.

N-methyl - N - (1,2-bis-p-methoxyphenyl-2-hydroxyethyl) amine contains two asymmetric carbon atoms and thus two racemic modifications. Four optically active isomers are possible. The penicillin salt of the levo isomer of the erythro pair of N-methyl-N-(1,2-bis-p-methoxyphenyl-2-hydroxyethyl) amine can be prepared by mixing one equivalent of a water-soluble penicillin salt such as potassium penicillin G in aqueous solution with two equivalents of an aqueous solution of the hydrochloride of dl-erythro-N-methyl-N-(1,2 - bis-p-methoxyphenyl-2-hydroxyethyl) amine obtained by the reductive amination of anisoin with methylamine. The crystalline penicillin salt of l-erythro-N-methyl-N-(1,2-bis-p-methoxyphenyl - 2 - hydroxyethyl) amine precipitates from the aqueous solution and is recovered therefrom by filtration and dried. (Nitrogen analysis: calculated 6.76; found 6.43%. Melting point: 170–176° C. with decomposition, the melting point being determined by raising the temperature of a Fisher-John melting point apparatus 3° per minute and introducing the sample at 165° C. Specific rotation at a concentration of 1% in methanol at 25° C. taken within one-half hour after dilution is +80° ±5°.) The dextro isomer of the same pair does not form a precipitate with penicillin under the above conditions but the amine isomer can be recovered from the filtrate by adjusting the pH between 10–12 with an aqueous solution of sodium hydroxide. One mole of potassium penicillin is reacted with two moles of dl-erythro-N-methyl - N - (1,2-bis-p-methoxyphenyl - 2 -hydroxyethyl) amine in order to obtain near quantitative yields of the salt of the levo isomer based on the quantity of penicillin used due to the presence of the dextro isomer. The penicillin salt of d-erythro - N - methyl-N-(1,2-bis-p-methoxyphenyl-2-hydroxyethyl) amine can be prepared by mixing a water-soluble penicillin salt such as potassium penicillin G with a concentrated aqueous solution of the hydrochloride of d-erythro-N-methyl - N - (1,2-bis-p-methoxyphenyl-2-hydroxyethyl) amine. The penicillin salt of d-erythro - N - methyl - N - (1,2-bis-p-methoxyphenyl-2-hydroxyethyl) amine precipitates from the aqueous solution and is recovered therefrom by filtration and dried. This penicillin salt precipitates in amorphous form having a specific rotation of 217°±5° at a concentration of 1% in methanol at 25° C. taken within one-half hour after dilution. The l and d-erythro-N-methyl-N-(1,2-bis-p-methoxyphenyl - 2 - hydroxyethyl) amine salts of other forms of penicillin such as penicillin F, penicillin K, and it can be prepared in the same manner as described above for penicillin G.

The levo and dextro isomers forming the threo racemate of N-methyl-N-(1,2-bis-p-methoxyphenyl-2-hydroxyethyl)amine are prepared by inverting the dextro and levo isomers of the erythro pair using the method of Welsh (Journal of the American Chemical Society, volume 69, page 128; Journal of the American Chemical Society, volume 71, page 3500) as applied to ephedrine, which consists essentially of acetylating the dextro and levo isomers of the erythro pair and hydrolyzing the acetylated product with dilute acid in order to bring about inversion. The penicillin G salts of the levo and dextro isomers forming the threo racemate of N-methyl-N-(1,2 - bis - p - methoxyphenyl-2-hydroxyethyl)amine are prepared by reacting an isomer of the base with a water-soluble penicillin salt such as potassium penicillin in dilute aqueous dilution. A crystalline penicillin salt of the base precipitates from the aqueous solution and can be isolated by filtration and dried. If the precipitate obtained is an amorphous material it can be crystallized by dissolving the amorphous material in methanol and precipitating the material in crystalline form by adding ether after which the material can be isolated by filtration and dried. The dextro and levo isomers of the threo racemate of N-methyl-N-(1,2 - bis-p-methoxyphenyl-2-hydroxyethyl)-amine in this specification and the attached claims are denominated d-threo and l-threo respectively. The penicillin G salt of the d-threo isomer has a melting point of 166° C. with decomposition and has a specific rotation of +227°±5° at a concentration of 1% in methanol at 25° C. taken within one-half hour after dilution while the specific rotation of the penicillin G salt of the l-threo isomer taken under the same conditions is +84°±5°, the latter compound having a melting point of 167–168° C. with decomposition. The l-threo and d-threo isomers can be employed to form salts of other forms of penicillin just as described above for penicillin G.

Blood level tests were conducted wherein my new penicillin salts of N-methyl-N-(1,2-bis-p-methoxyphenyl - 2 - hydroxyethyl)amine were given orally and injected intramuscularly into dogs, the amount of penicillin in the blood stream being measured at definite intervals after administration. The following table shows the blood levels obtained after a portion of my new penicillin G salt of l-erythro-N-methyl-N-(1,2-bis-p-methoxyphenyl - 2 - hydroxyethyl)amine containing the indicated number of units of penicillin was injected intramuscularly in aqueous suspension.

TABLE I

[Blood level; 60,000 units/dog—intramuscularly; units penicillin/ml. serum.]

| Dog No. | Hours | | | | | | | | | | | |
|---|---|---|---|---|---|---|---|---|---|---|---|---|
| | 0 | 6 | 12 | 24 | 36 | 48 | 60 | 72 | 84 | 96 | 108 | 120 |
| 233 | 0 | .140 | .100 | .058 | .033 | .037 | .064 | .180 | | | | |
| 236 | 0 | .170 | .096 | .150 | .056 | .088 | .112 | .120 | | | | |
| 240 | 0 | .125 | .138 | .110 | .056 | .084 | .130 | .107 | | | | |
| 874 | 0 | .245 | .138 | .103 | .066 | .069 | .122 | .108 | | | | |
| 661 | 0 | .150 | .110 | .115 | .056 | .108 | .135 | .175 | | | | |
| 662 | 0 | .145 | .068 | .118 | .031 | .072 | .102 | .140 | | | | |
| 233 | 0 | .104 | .089 | .072 | .056 | .081 | .096 | .096 | .070 | 0 | 0 | 0 |
| 236 | 0 | .162 | .083 | .134 | .090 | .170 | .134 | .202 | .034 | 0 | 0 | 0 |
| 240 | 0 | .161 | .079 | .075 | .048 | .088 | .070 | .117 | .062 | .082 | .081 | .041 |
| 874 | 0 | .180 | .108 | .076 | .083 | .100 | .093 | .125 | .062 | .060 | .061 | .035 |
| 089 | 0 | .110 | .104 | .083 | .045 | .100 | .076 | .104 | .081 | .062 | .068 | 0 |
| 112 | 0 | .098 | .086 | .081 | .059 | .062 | .044 | .043 | .026 | .024 | .041 | .037 |

The following table is offered for comparison purposes. It shows blood levels obtained when procaine penicillin G was injected intramuscularly, 60,000 units of penicillin being injected into each dog. Procaine penicillin G is the most widely known repository form of penicillin previously used.

TABLE II

[Blood level; procaine penicillin—intramuscularly; units penicillin/ml. serum.]

| Dog No. | Hours | | | | | |
|---|---|---|---|---|---|---|
| | 0 | 1 | 2 | 6 | 12 | 24 |
| 49 | 0 | 0.730 | 0.810 | 0.420 | 0.395 | 0 |
| 58 | 0 | 0.435 | 0.480 | 0.370 | 0.320 | 0 |
| 61 | 0 | 0.890 | 0.580 | 0.700 | 0.103 | 0 |
| 76 | 0 | 0.645 | 0.840 | 0.650 | 0.320 | 0 |

It can be seen from a comparison of Tables I and II giving data on blood levels obtained after intramuscular injections of the penicillin G salt of l-erythro-N-methyl-N-(1,2 - bis-p-methoxyphenyl-2-hydroxyethyl)amine and procaine penicillin G, that my new compound gives blood levels over seven times as long as that obtained with the previous most generally used repository form of penicillin.

The following table indicates blood levels obtained when my new penicillin G salt of l-erythro - N - methyl-N-(1,2-bis-p-methoxyphenyl-2-hydroxyethyl)amine was administered orally, 100,000 units of penicillin being administered to each dog.

TABLE III

[Blood level; 100,000 unit tablet—orally; units penicillin/ml. serum.]

| Dog No. | Hours | | | | |
|---|---|---|---|---|---|
| | 0 | 2 | 4 | 6 | 8 |
| 233 | 0 | .103 | 0 | 0 | 0 |
| 236 | 0 | .400 | .161 | .051 | 0 |
| 240 | 0 | 1.22 | .200 | .048 | 0 |
| 874 | 0 | 1.70 | .670 | .092 | 0 |
| 235 | 0 | .680 | .051 | .032 | <0.02 |
| 238 | 0 | .515 | .071 | .033 | <0.02 |
| 239 | 0 | 1.27 | .080 | .150 | .020 |
| 661 | 0 | 2.18 | .020 | <0.02 | 0 |

The following table indicates blood levels obtained when my new penicillin G salt of d-threo-N-methyl-N-(1,2-bis-p-methoxyphenyl - 2 - hydroxyethyl)amine was injected intramuscularly into dogs in an aqueous suspension.

TABLE IV

[Blood level; 60,000 units/dog—intramuscularly; units penicillin/ml. serum.]

| Dog No. | Hours | | | | | |
|---|---|---|---|---|---|---|
| | 0 | 1 | 6 | 12 | 24 | 36 |
| 238 | 0 | .172 | .230 | .191 | .228 | 0 |
| 239 | 0 | 1.000 | .108 | .162 | .040 | 0 |
| 007 | 0 | .390 | .390 | .127 | 0 | 0 |

The following table shows the results of acute toxicity tests of my new penicillin G salt of l-erythro - N - methyl-N-(1,2-bis-p-methoxyphenyl-2-hydroxyethyl)amine conducted on laboratory mice. The table shows the amount of my new compound which can be administered without any mouse fatalities and the amount given to produce a 50% kill of the mice tested. The penicillin salt was injected intraperitoneally and subcutaneously as indicated in the table.

TABLE V

*Mouse toxicity*

| | $LD_0$ | $LD_{50}$ |
|---|---|---|
| | mg./kg. of Body Weight of Test Mice | |
| Intraperitoneally | 1,000 | 1,500 |
| Subcutaneously | >5,000 | |

The following table shows the results of acute toxicity tests of procaine penicillin conducted on laboratory mice and is offered for purposes of comparison with the results shown above in Table V obtained with my new penicillin salt of l-erythro - N - methyl-N-(1,2-bis-p-methoxyphenyl-2-hydroxyethyl)amine. The penicillin salt was injected intraperitoneally and subcutaneously as indicated in the table.

TABLE VI

*Mouse toxicity*

| | $LD_0$ | $LD_{50}$ |
|---|---|---|
| | mg./kg. of Body Weight of Test Mice | |
| Intraperitoneally | 300 | 340±28 |
| Subcutaneously | 4,000 | |

The following table shows the results of subacute toxicity tests of the new penicillin G salt of l-erythro-N-methyl - N - (1,2-bis-p-methoxyphenyl-2-hydroxyethyl)amine conducted on laboratory mice. The table shows the mortality ratio after a 14-day observation period following the daily subcutaneous injection of my new salt at the dosage levels indicated for 14 days.

TABLE VII

*Subacute mouse toxicity*

| Dosage, mg./kg. Body Weight | Mortality Ratio |
|---|---|
| 625 | 0/10 |
| 1,250 | 6/10 |
| 2,500 | 9/10 |

From a consideration of the above tables it can be seen that my new compounds are distinct improvements over procaine penicillin G which has heretofore been the most widely used repository form of penicillin.

Now having disclosed my invention what I claim is:

1. The penicillin salts of N-methyl-N-(1,2-bis-p-methoxyphenyl-2-hydroxyethyl)amine.
2. The penicillin G salts of N-methyl-N-(1,2-bis-p-methoxyphenyl-2-hydroxyethyl)amine.
3. The penicillin G salt of l-erythro-N-methyl-N-(1,2-bis-p-methoxyphenyl - 2 - hydroxyethyl)-amine.
4. The penicillin G salt of d-erythro-N-methyl-N-(1,2-bis-p-methoxyphenyl - 2 - hydroxyethyl)amine.
5. The penicillin G salt of l-threo-N-methyl-N-(1,2-bis-p-methoxyphenyl - 2 - hydroxyethyl)-amine.
6. The penicillin G salt of d-threo-N-methyl-N-(1,2-bis-p-methoxyphenyl - 2 - hydroxyethyl)-amine.

VERNON V. YOUNG.

References Cited in the file of this patent

Kadison et al., "Am. Practitioner and Digest of Treatment," vol. 2, May 1951, pp. 411 to 413.